US008531694B2

(12) United States Patent
Kamekawa

(10) Patent No.: US 8,531,694 B2
(45) Date of Patent: *Sep. 10, 2013

(54) APPENDING RESTRICTION INFORMATION TO A JOB BEFORE TRANSMISSION

(75) Inventor: Mikihiko Kamekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/692,945

(22) Filed: Jan. 25, 2010

(65) Prior Publication Data
US 2010/0202007 A1 Aug. 12, 2010

(30) Foreign Application Priority Data

Feb. 9, 2009 (JP) ................................ 2009-027785

(51) Int. Cl.
*G06K 15/00* (2006.01)
(52) U.S. Cl.
USPC ......................... 358/1.14; 358/1.15
(58) Field of Classification Search
USPC ................................ 358/1.14, 1.15
See application file for complete search history.

(56) References Cited

U.S. PATENT DOCUMENTS

| 2003/0093298 | A1 | 5/2003 | Hernandez et al. | 705/2 |
| 2006/0001900 | A1 | 1/2006 | Watanabe et al. | 358/1.14 |
| 2006/0061792 | A1* | 3/2006 | Kim et al. | 358/1.13 |
| 2006/0256364 | A1* | 11/2006 | Yamamoto | 358/1.14 |
| 2007/0035765 | A1* | 2/2007 | Corona | 358/1.15 |
| 2007/0050368 | A1 | 3/2007 | Watanabe | 707/9 |
| 2007/0118735 | A1* | 5/2007 | Cherrington et al. | 713/155 |
| 2007/0283414 | A1 | 12/2007 | Sugiyama | 726/1 |
| 2008/0086778 | A1 | 4/2008 | Asahara | 726/26 |
| 2009/0116060 | A1* | 5/2009 | Yamamichi | 358/1.15 |
| 2010/0149570 | A1 | 6/2010 | Kamiya et al. | 358/1.13 |
| 2010/0328723 | A1 | 12/2010 | Kamekawa | 358/1.15 |

FOREIGN PATENT DOCUMENTS

| JP | 2000-122766 A | 4/2000 |
| JP | 2005-333561 A | 12/2005 |
| JP | 2006-050538 A | 2/2006 |
| JP | 2007-058567 A | 3/2007 |
| JP | 2007-095034 A | 4/2007 |
| JP | 2007-323324 | 12/2007 |
| JP | 2008-098784 A | 4/2008 |

* cited by examiner

*Primary Examiner* — Eric A Rust
(74) *Attorney, Agent, or Firm* — Fitzpatrick, Cella, Harper & Scinto

(57) ABSTRACT

The image forming apparatus holds related restriction information associated with function restriction information for restricting the use of a function provided within the network. With the related restriction information, when the image forming apparatus receives a job that executes a reading function and a transmission function, it displays, for a transmission source user, a settings screen for setting job operation settings in which restrictions held in the function restriction information and the related restriction information have been reflected. Furthermore, the image forming apparatus generates and transmits a send file in which the restrictions imposed on the transmission destination user have been reflected by using the job operation settings set via the settings screen, the function restriction information and the related restriction information.

9 Claims, 11 Drawing Sheets

F I G. 4

| USER NAME | COPY | SCAN | SEND | FAX | TRANSMISSION DESTINATION INFORMATION |
|---|---|---|---|---|---|
| USER A | ○ | ○ | ○ | ○ | User_A@mail.xxxxx.jp |
| USER B | ○ | ○ | × | ○ | User_B@mail.xxxxx.jp |
| USER C | ○ | ○ | ○ | × | User_C@mail.xxxxx.jp |
| USER D | × | ○ | ○ | ○ | User_D@mail.xxxxx.jp |
| USER E | × | ○ | ○ | ○ | – |

FIG. 5

| RESTRICTION FUNCTION NAME | RESTRICTION PROCESS NAME | ENABLE/ DISABLE | TARGET FORMAT | RESTRICTION ITEM | | |
|---|---|---|---|---|---|---|
| | | | | PRINTING DISABLED | EDITING DISABLED | PASSWORD FIXED |
| COPY | SEND | ENABLED | PDF | | | |
| COPY | SEND | DISABLED | TIFF, JPEG | - | - | - |
| COPY | FAX | DISABLED | - | - | - | - |

FIG. 6

| TRANSMISSION JOB ID | PRESENCE/ ABSENCE OF RESTRICTION | FILE TYPE | TRANSMISSION DESTINATION USER INFORMATION | STORAGE LOCATION |
|---|---|---|---|---|
| 1 | ABSENT | PDF | USER A | 0x1111111 |
| 1 | PRESENT | PDF | USER D | 0x2222222 |
| 2 | ABSENT | PDF | USER E | /data/tmp/job2/xyz |

APPENDING RESTRICTION INFORMATION TO A JOB BEFORE TRANSMISSION

BACKGROUND OF THE INVENTION

1. Field of the Invention

The present invention relates to an image processing apparatus that imposes an appropriate function restriction on data that is to be transmitted to an external device, a control method thereof, and a computer program.

2. Description of the Related Art

In recent years, computer networks (hereinafter referred to simply as networks) that connect computers are becoming widely used. To such a network, not only computers but also image processing apparatuses such as a printer, a facsimile, a copy machine and a scanner are connected.

With respect to the use of such image processing apparatuses, from the viewpoint of reducing the possibility of an information leak of printed matter and electronic information, there is a demand for a function of setting a restriction on the use thereof. The following proposal has been made for such a function, for example. Japanese Patent Laid-Open No. 2007-323324 has proposed a technique for imposing function restrictions on a user-by-user basis with respect to the use of an MFP.

However, the above conventional technique has the following problems. For example, there is a situation in which a user who is restricted from using a copy function may be permitted to use a scan function and an external transmission function. In such a case, a restriction is imposed when the user attempts to use a copy function, but it is possible for the user to transmit image data obtained through scanning to an external apparatus by using an external transmission function, so the user can implement the same function as a copy function by printing the data at the transmission destination. In addition, in a situation in which a transmitting user and a receiving user as a transmission destination are different, restrictions according to the rights of the receiving user are not performed, which may differ from the rights given to the transmitting user by the system.

SUMMARY OF THE INVENTION

The present invention enables realization of an image processing apparatus capable of imposing a function restriction on a transmission destination user regarding combined use of a plurality of functions when transmitting image data, and a control method thereof.

One aspect of the present invention provides an image processing apparatus that is capable of transmitting image data to a designated transmission destination, the apparatus comprising: an input unit that inputs image data; an acquiring unit that acquires restriction information for restricting use of an image processing function by a user corresponding to the transmission destination; a determining unit that determines a restriction function for the image data input by the input unit based on the restriction information acquired by the acquiring unit and an image processing function that can be implemented through combined use of the image processing apparatus and another image processing apparatus; an appending unit that appends attribute information regarding the restriction function determined by the determining unit to the image data input by the input unit; and a transmitting unit that transmits the image data to which the attribute information regarding the restriction function has been appended by the appending unit.

Another aspect of the present invention provides a method of controlling an image processing apparatus that is capable of transmitting image data to a designated transmission destination, the method comprising: inputting image data; acquiring restriction information for restricting use of an image processing function by a user corresponding to the transmission destination; determining a restriction function for the image data input in the input step based on the restriction information acquired in the acquiring step and an image processing function that can be implemented through combined use of the image processing apparatus and another image processing apparatus; appending attribute information regarding the restriction function determined in the determining step to the image data input in the input step; and transmitting the image data to which the attribute information regarding the restriction function has been appended in the appending step.

Further features of the present invention will be apparent from the following description of exemplary embodiments with reference to the attached drawings.

BRIEF DESCRIPTION OF THE DRAWINGS

FIG. 4 is a diagram showing the content of function restriction information that is held by the user restriction information management apparatus 101 according to an embodiment of the present invention.

FIG. 5 is a diagram showing the content of related restriction information that is used in association with function restriction information according to an embodiment of the present invention.

FIG. 6 is a diagram showing transmission information according to an embodiment of the present invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Forming System

Figure 1:
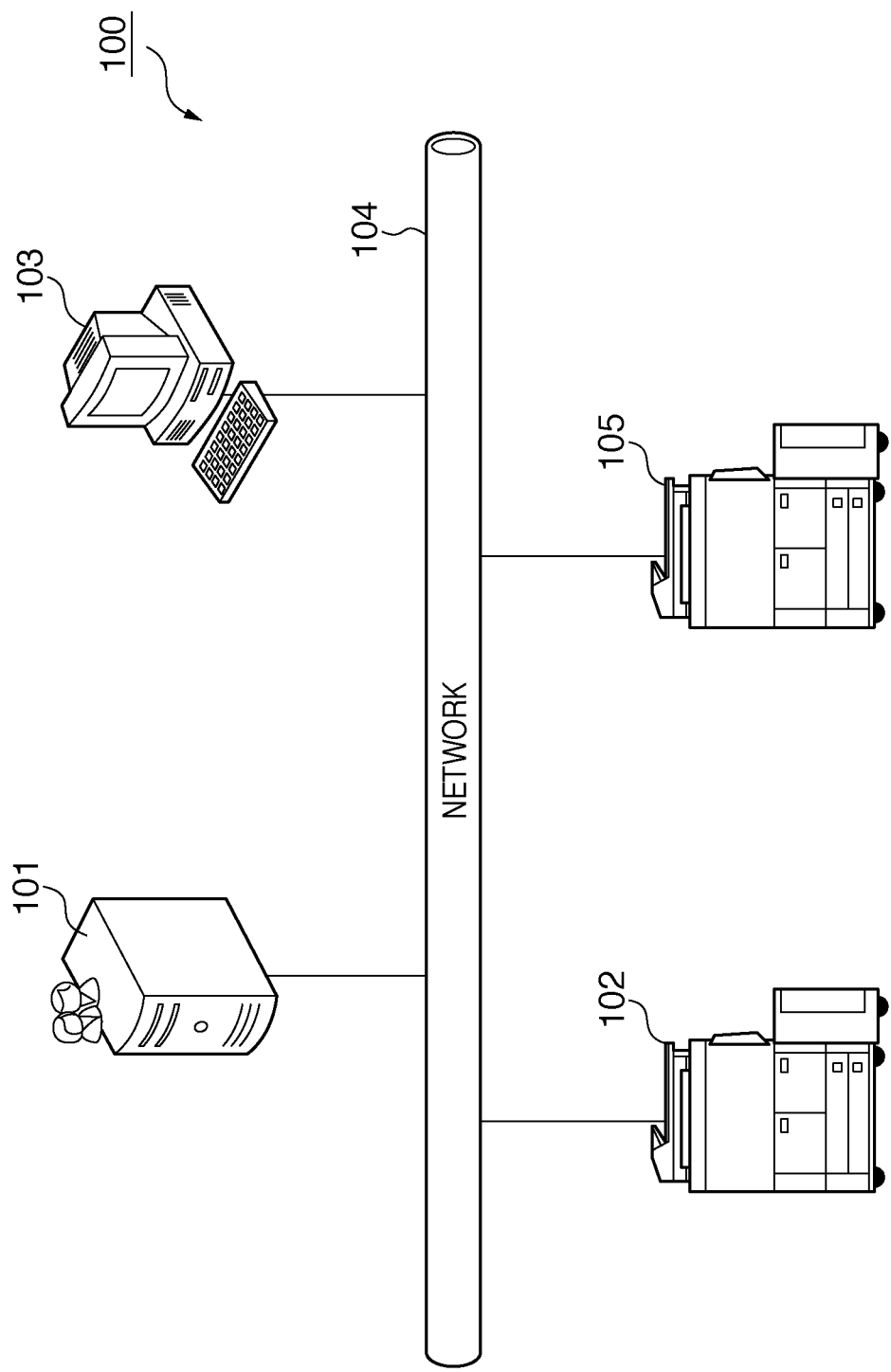
FIG. 1 is a diagram showing an example of a configuration of an image forming system according to an embodiment of the present invention.

An image forming system 100 according to an embodiment of the present invention will be described first with reference to FIG. 1. FIG. 1 is a diagram showing an example of a configuration of an image forming system according to the present embodiment.

As shown in FIG. 1, the image forming system 100 includes a user restriction information management apparatus 101, image forming apparatuses 102 and 105, and a client apparatus 103. These apparatuses are connected via a network 104 so as to be capable of mutual communication.

The user restriction information management apparatus 101 manages usage restriction information regarding various functions of the image forming apparatuses 102 and 105 on a user-by-user basis, and provides usage restriction information that corresponds to a user when it receives an inquiry from the image forming apparatuses 102 and 105 at an arbitrary timing. That is, the image forming apparatuses 102 and 105 can acquire usage restriction information for a user by informing the user restriction information management apparatus 101 of, for example, a user ID assigned uniquely to each user. Alternatively, usage restrictions may be given for a group ID that is used by a plurality of users, instead of an individual user ID.

The image forming apparatuses 102 and 105 are digital multifunctional peripherals (MFPs) with a function of copying a paper original, a function of reading a paper original and transmitting the read data to an external apparatus (hereinafter referred to as a send function) and a facsimile transmission function. In the present embodiment, an example will be described in which two MFPs are provided in the image forming system 100. However, the image forming system 100 may include more MFPs, a SFP (Single Function Peripheral) that is an image forming apparatus with a single function, a scanner apparatus, a FAX apparatus and so on. In addition, an image processing apparatus without an image forming function of forming an image on a paper sheet may be included. The client apparatus 103 is an apparatus that receives image data transmitted from the image forming apparatuses 102 and 105, and can be a PC or a server. The network 104 is implemented in the form of an intranet or the Internet that provides bidirectional communication between apparatuses.

Configuration of Image Forming Apparatus

Figure 2:
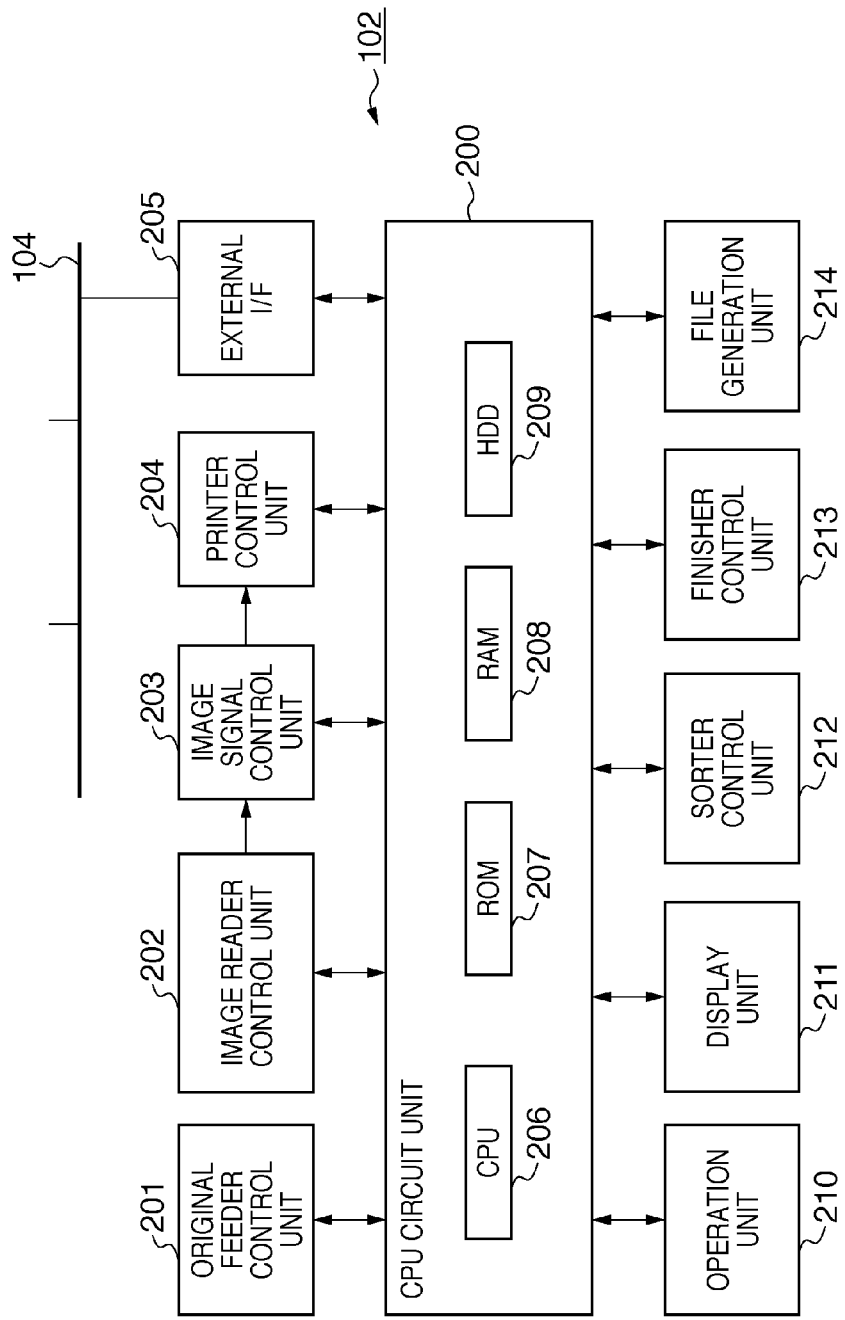
FIG. 2 is a block diagram showing an example of a configuration of an image forming apparatus according to an embodiment of the present invention.

A control configuration of the image forming apparatus 102 will be described next with reference to FIG. 2. FIG. 2 is a block diagram showing an example of a configuration of an image forming apparatus according to the present embodiment. The image forming apparatus 105 also has the same control configuration as that of the image forming apparatus 102.

The image forming apparatus 102 includes a CPU circuit unit 200 for collectively controlling the image forming apparatus. To the CPU circuit unit 200, are connected via signal cables indicated by arrows in FIG. 2, an original feeder control unit 201, an image reader control unit 202, an image signal control unit 203, a printer control unit 204, an external I/F 205, an operation unit 210, a display unit 211, a sorter control unit 212, a finisher control unit 213 and a file generation unit 214. The image forming apparatus 102 may be an apparatus that transmits image data without the printer control unit 204, the sorter control unit 212 and the finisher control unit 213. Alternatively, the image forming apparatus 102 may be an apparatus that reads an original placed on a platen without the original feeder control unit. Alternatively, the image forming apparatus 102 may be an apparatus that receives an input of image data through an operation other than reading an original. Alternatively, the image forming apparatus 102 may be connected to a telephone line (not shown) and provided with a facsimile communication function.

The CPU circuit unit 200 includes a CPU 206, a ROM 207, a RAM 208 and a HDD 209. The CPU 206 collectively controls the control blocks connected to the CPU circuit unit 200 based on a control program stored in the ROM 207. The RAM 208 temporarily holds control data. The RAM 208 is used as a work area for operation processing that accompanies controlling. The HDD 209 stores necessary information for the control program and information received from each unit.

The original feeder control unit 201 drives and controls an original feeder that automatically feeds an original set on an original loading unit to an original reading position based on an instruction from the CPU 206. The image reader control unit 202 drives and controls a scanner unit that scans an original, an image sensor that performs photoelectric conversion to convert an optical image of an original to an electrical signal, and the like, and transfers an analog image signal output from an image sensor to the image signal control unit 203. The image signal control unit 203 performs various processes after the analog image signal has been converted to a digital signal, converts the digital signal to a video signal, and outputs the video signal to the printer control unit 204. The printer control unit 204 drives an exposure control unit that controls exposure on a photosensitive member based on the input video signal.

The external I/F 205 performs various processes on an input digital image signal from an external apparatus via the network 104, converts the digital image signal to a video signal, and outputs the video signal to the printer control unit 204. The external I/F 205 also controls communication with the user restriction information management apparatus 101, the client apparatus 103 and the image forming apparatus 105 via the network 104.

The operation unit 210 includes a display unit for displaying a plurality of keys for setting various functions and information that indicates the status of a setting, and outputs a key signal corresponding to the operation of each key to the CPU circuit unit 200. The display unit 211 displays the content of input through the operation unit 210, the status of each control unit and the like based on a signal from the CPU circuit unit 200.

The sorter control unit 212 drives and controls a sorter mechanism that sorts paper sheets on which image formation has been completed. The finisher control unit 213 drives and controls a finisher mechanism that performs post-processing on paper sheets on which image formation has been completed (a punching process for making holes in paper sheets, a stapling process for binding paper sheets, and so on). The sorter control unit 212 and the finisher control unit 213 are operated based on a signal from the CPU circuit unit 200 in accordance with an input through the external I/F 205 or a setting through the operation unit 210 from the user.

The file generation unit 214 generates a file in an instructed format based on image information processed by the image signal control unit 203, and saves the file in the RAM 208 or the HDD 209. The file generated by the file generation unit 214 is transmitted to the client apparatus 103 through the external I/F 205.

Figure 3:
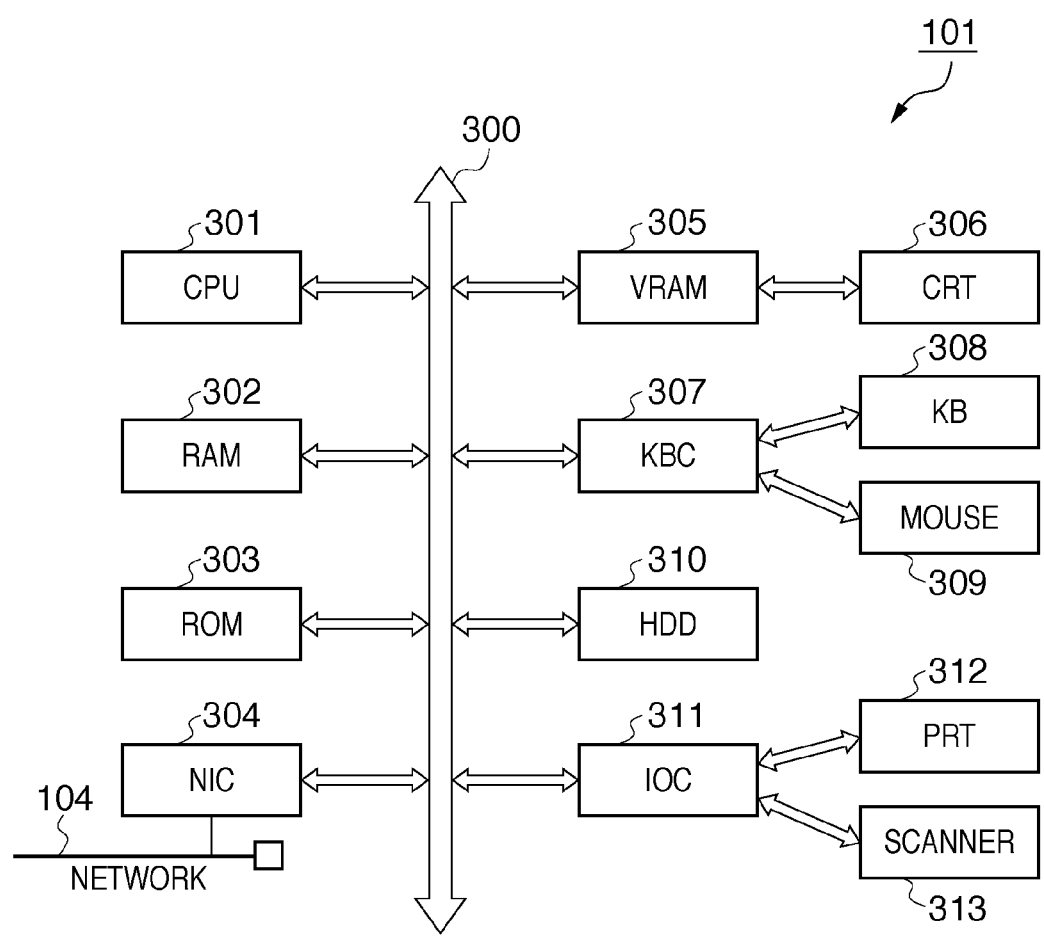
FIG. 3 is a block diagram showing a control configuration of a user restriction information management apparatus 101 according to an embodiment of the present invention.

Configuration of User Restriction Information Management Apparatus and Client Apparatus A control configuration of the user restriction information management apparatus and the client apparatus according to the present embodiment will be described next with reference to FIG. 3. FIG. 3 is a block diagram showing a control configuration of the user restriction information management apparatus 101 of the present embodiment. In the present embodiment, a control configuration of the user restriction information management apparatus 101 will be described, but the client apparatus 103 also has the same configuration.

As shown in FIG. 3, the user restriction information management apparatus 101 includes a CPU 301, a RAM 302, a ROM 303, a NIC 304, a VRAM 305, a KBC 307, a HDD 310 and an IOC 311. The user restriction information management apparatus 101 also includes a system bus 300 that connects these units and transmits a variety of data, control information and the like.

The CPU 301 is a central processing apparatus that controls various operations of the user restriction information management apparatus 101 and computation. The RAM 302 is a random access memory, and provides a storage area for an execution program as a main memory of the CPU 301, an execution area for the execution program, and a data storage area. The ROM 303 is a read-only memory that stores an operation processing procedure of the CPU 301, and stores a basic program (generally called a BIOS) that controls each unit of the user restriction information management apparatus 101 and information and the like necessary to run a system. The HDD 310 is a hard disk drive and is used to store application programs, document data, a variety of management data and the like used within the user restriction information management apparatus 101.

The NIC 304 is a controller for controlling input and output signals to and from an external network. The NIC 304 is a communication controller used to connect to the network 104.

The VRAM 305 is a video RAM, and expands image data to be displayed on a CRT 306 and controls display. The CRT 306 is a display apparatus that is connected to the VRAM 305 and displays a variety of information from the user restriction information management apparatus 101. The CRT 306 is incorporated within the user restriction information management apparatus 101, or used separately as a different component from the user restriction information management apparatus 101. As the display apparatus, a liquid crystal display apparatus, a touch panel-type liquid crystal display apparatus or the like may be used.

The KBC 307 is a controller that receives and controls an input signal from input apparatuses that are connected to the user restriction information management apparatus 101 such as a KB 308 and a mouse 309. The KB 308 and the mouse 309 are input apparatuses that receive input information from the user. Instead of such input apparatuses, an input unit of the above-described touch panel-type liquid crystal display apparatus may be used.

The IOC 311 is a controller for controlling input and output signals to and from the user restriction information management apparatus 101, namely, a scanner 313 as an information input apparatus, a PRT 312 as an output apparatus, and the like. The IOC 311 may be connected to external input/output apparatuses other than the scanner 313 and the PRT 312, for example, information devices such as an externally connected HDD and an MO drive. The PRT 312 is a printer for printing electronic image data held by the user restriction information management apparatus 101. The scanner 313 is a reading apparatus for reading the content written on the surface of a paper original as electronic image data.

Function Restriction Information

Next, function restriction information for restricting the use of an image processing function provided within a network of the image forming system 100 of the present embodiment will be described with reference to FIGS. 4 to 6. FIG. 4 is a diagram showing the content of function restriction information held by the user restriction information management apparatus 101 of the present embodiment.

In the function restriction information, copy 402, scan 403, send 404, fax 405 and transmission destination information 406 are defined according to user name 401. User name 401 is information for identifying a user managed by the user restriction information management apparatus 101. Copy 402 indicates permission information for using a copy function of copying an original. Scan 403 indicates permission information for using a reading function of reading an original. Send 404 indicates permission information for using a transmission function of transmitting image data read from an original or image data stored in advance to another apparatus via the network 104. Fax 405 indicates permission information for using a function of reading an image from an original and transmitting the read image data to a facsimile apparatus that is connected to a telephone line (not shown).

In the image forming system 100 of the present embodiment, a function restriction is provided for each function such as copy 402, scan 403, send 404 or fax 405 according to user name 401. In FIG. 4, "○" represents permission for a function, and "x" represents restriction of the use of a function. As used herein, restriction of the use of a function means that the execution of the function is prohibited.

Transmission destination information 406 is information that indicates a transmission destination held by a user, such as an email address, and is used as a transmission destination when a send function is performed. Here, the transmission destination information 406 is provided in the function restriction information, but it may be provided in user information that is different from the function restriction information.

A record 411 shown in FIG. 4 indicates that a user A is permitted to use all of the functions including "copy", "scan", "send" and "fax". A record 412 indicates that a user D is permitted to use only the functions "scan", "send" and "fax", and is prohibited from using a "copy" function. A record 413 indicates that a user E is permitted to use the same functions as those of the user D, but an email address has not been set.

FIG. 5 is a diagram showing the content of related restriction information that is used in association with the function restriction information according to the present embodiment. The related restriction information is held by the image forming apparatuses 102 and 105. The related restriction information refers to information for restricting another function from being used in association with a function restricted by the function restriction information.

In the related restriction information, a restriction function name 501, restriction process name 502, enable/disable 503, target format 504 and restriction item 505 are defined. The restriction function name 501 and restriction process name 502 are items that indicate any one of copy 402, scan 403, send 404 and fax 405 of the function restriction information managed by the user restriction information management apparatus 101. Specifically, the restriction function name 501 indicates a function (image processing function) restricted in the function restriction information. The restriction process name 502 indicates a function that is to be restricted in association with a function that is set in the restriction function name 501 and restricted in the function restriction information.

The enable/disable 503 indicates whether or not it is possible to use a function set in restriction process name 502. The target format 504 indicates an information format that is enabled/disabled by the enable/disable 503. When no information format has been designated, it indicates that all information formats are included. The restriction item 505 indicates restriction items restricted when "enabled" is written in enable/disable 503.

For example, a record 511 indicates that when a user who is prohibited from using a "copy" function in the function restriction information uses a "send" function, the user can transmit data in a "PDF" format to which the restrictions "printing disabled", "editing disabled" and "password fixed" have been appended. That is, only a file format to which security information (attribute information) that indicates the prohibition of printing or the prohibition of copying as described above can be appended is defined. A record 512 indicates that when a user who is prohibited from using a "copy" function in the function restriction information uses a "send" function, the user cannot transmit data in "TIFF" and "JPEG" formats. A record 513 indicates that a user who is prohibited from using a "copy" function in the function restriction information is prohibited from using a "fax" function.

FIG. 6 is a diagram showing transmission information according to the present embodiment. The transmission information is held by the image forming apparatuses 102 and 105, and information for transmitting a file when a send function is executed is defined.

In the transmission information, a transmission job ID, the presence/absence of restriction 602, file type 603, transmission destination user information 604 and storage location 605 are defined. The transmission job ID 601 is an ID that uniquely indicates a transmission job executed by the image forming apparatus 102 or 105. With the use of the ID, it is possible to specify the transmission information for a job being processed. The presence/absence of restriction 602 indicates whether or not there is a transmission restriction. Even the same job can have different types of transmission information depending on the presence or absence of a restriction. The file type 603 indicates a file identifier that indicates the type of a file to be transmitted. The transmission destination user information 604 indicates the destination information for a file to be transmitted by a transmission job. The storage location 605 indicates the storage location of a file to be transmitted.

A record 611 indicates that a file without a transmission restriction is to be transmitted to the user A in PDF format. A record 612 indicates that a file with a transmission restriction is to be transmitted to the user D in PDF format. The records 611 and 612 indicate the details of transmission performed by a transmission job 1. A record 613 indicates that a file without a transmission restriction is to be transmitted to the user E in PDF format by a transmission job 2.

Process Sequence

Figure 7:
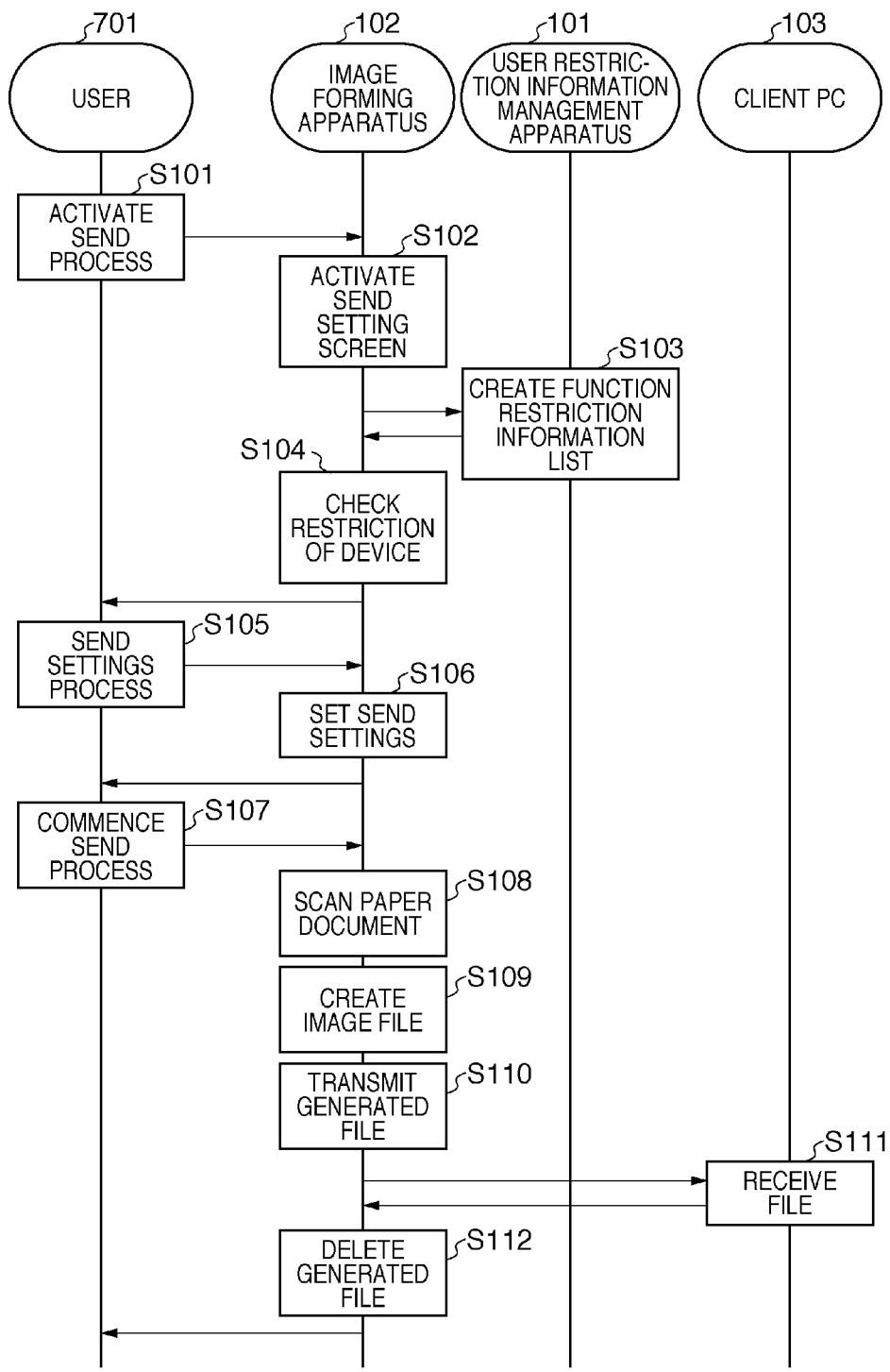
FIG. 7 is a sequence diagram showing a processing procedure of an entire process performed in the image forming system according to an embodiment of the present invention.

An entire process sequence of the present embodiment will be described next with reference to FIG. 7. FIG. 7 is a sequence diagram showing a processing procedure of an entire process performed by the image forming system of the present embodiment. A user 701 represents a user who uses the image forming system 100. It is assumed here that, in order to use this process sequence, the user 701 has undergone user authentication in advance by the user restriction information management apparatus 101 via the image forming apparatus 102, and the use of the image forming apparatus 102 has been enabled.

First, in Step S101, the user 701 makes a request to the image forming apparatus 102 to activate a send process. Upon receiving the send process request, in Step S102, the image forming apparatus 102 activates a send settings screen. Specifically, the image forming apparatus 102 reads the resource of the settings screen and generates screen information. Furthermore, the image forming apparatus 102 makes a request for function restriction information that corresponds to the user 701 who has made the send process request to the user restriction information management apparatus 101.

In Step S103, the user restriction information management apparatus 101 searches for the function restriction information corresponding to a designated user, and transmits the restriction information to the image forming apparatus 102. Subsequently, in Step S104, the image forming apparatus 102 causes the restriction information to be reflected in the send settings screen based on the function restriction information list acquired from the user restriction information management apparatus 101. Step S104 will be described later in detail with reference to FIG. 11. Upon completion of the processing up to Step S104, the image forming apparatus 102 displays a send settings screen 801 shown in FIG. 8, which will be described later, on the display unit 211, so that it can be operated by the user 701.

In Step S105, the user 701 sets send process settings by using the displayed send settings screen 801. The send process settings are set by a procedure in which the content input by the user 701 through the operation unit 210 of the image forming apparatus 102 is processed by the image forming apparatus in Step S106 and reflected in the send settings screen 801 by using the display unit 211. The user 701 repeats Step S105 until the intended settings are obtained. The content of the settings that can be set by the user 701 and the setting screens for making such settings will be described later in detail with reference to FIGS. 8 to 10.

When the send settings has been set, in Step S107, the user 701 makes a request to the image forming apparatus 102 to commence a send process. Upon receiving the request to commence a send process, in Step S108, the image forming apparatus 102 reads image information on an original with the original feeder control unit 201 and the image reader control unit 202. The read image information is stored in the RAM 208 or the HDD 209.

Next, in Step S109, the image forming apparatus 102 generates a file from the read image information in accordance with the settings content made on the send settings screen 801. The generated file is stored in the RAM 208 or the HDD 209 as with the image information. The processing procedure for generating and storing a file in Step S109 will be described later with reference to FIG. 13.

Next, in Step S110, the image forming apparatus 102 transmits the file stored in the RAM 208 or the HDD 209 to a destination set on the send settings screen 801 through a designated protocol. Here, the file is transmitted to the client apparatus 103. The processing procedure for transmitting a file in Step S110 will be described later with reference to FIG. 14.

Upon transmission of the file, in Step S111, the client apparatus 103 receives the file through the designated protocol. Upon completion of file reception, the client apparatus 103 transmits a notification indicating completion of file reception to the image forming apparatus 102. Upon receiving the notification indicating completion of file reception, in Step S112, the image forming apparatus 102 deletes the send file and image information stored in the RAM 208 or the HDD 209 and the corresponding record information for the transmission information shown in FIG. 6.

Configuration of Send Settings Screen

Figure 8:
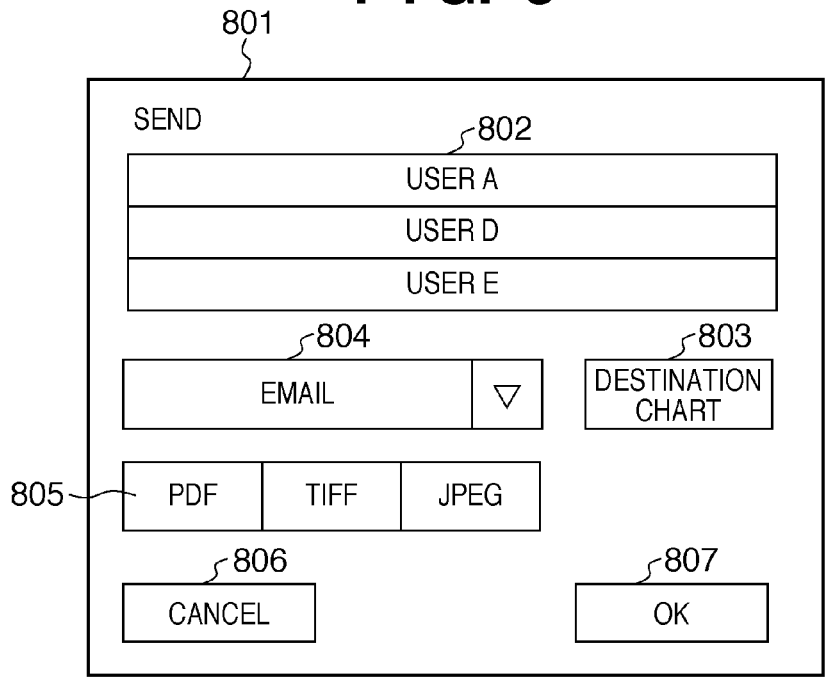
FIG. 8 is a diagram showing an example of a configuration of a send settings screen 801 according to an embodiment of the present invention.

Next, various settings screens displayed for a user will be described with reference to FIGS. 8 to 10. FIG. 8 is a diagram showing an example of a configuration of the send settings screen 801 of the present embodiment. The send settings screen 801 is configured to include a destination information display section 802 that indicates a transmission destination, a destination chart button 803 that activates the input of a destination, a transmission protocol selection section 804, a send file format selection section 805, a cancel button 806 and an OK button 807. The send settings screen 801 is a settings screen that allows a transmission source user who has requested a job to set the operation settings of the job.

In the destination information display section 802, a file transmission destination is displayed in a transmission format selected in the transmission protocol selection section 804. When email has been selected as a transmission format, an email address of the destination is displayed, and when FTP has been selected as a transmission format, destination server information is displayed. The destination chart button 803 is used to set a destination in the destination information display section 802. When the destination chart button 803 has been pressed, a destination settings screen 1001, which will be described later, is displayed, where selection of a destination registered in the destination chart or input of a new destination is possible. The destination information designated on the destination settings screen 1001 is reflected in the destination information display section 802 after confirmation. The destination information display section 802 shown in FIG. 8 indicates that the user A, the user D and the user E have been selected as destinations by using the destination settings screen 1001.

The transmission protocol selection section 804 is a section in which a communication protocol used to transmit a file by the send function is selected. File transfer protocols such as "email", "FTP" and "WebDAV" are displayed, and an arbitrary format can be selected from among the displayed file transfer protocols.

The send file format selection section 805 is a section in which a file format to be transmitted through the above-described protocol is selected. File formats that can be generated by the image forming apparatus 102 are displayed such as "PDF", "TIFF" and "JPEG" as shown in FIG. 8. In the send file format selection section 805, selectable formats are restricted by target format 504 shown in FIG. 5. That is, only selectable formats are displayed as pressable buttons. When a selectable button has been selected, an advanced settings screen 901, which will be described later, is displayed based on the selected file format, where detailed file settings can be set.

When the cancel button 806 has been pressed, the send process requested by the user 701 is cancelled. Accordingly, the content set by the user is cleared. When the OK button 807 has been pressed, a send process is commenced. Specifically, the processing spanning from Step S108 to Step S112 is performed.

Figure 9:
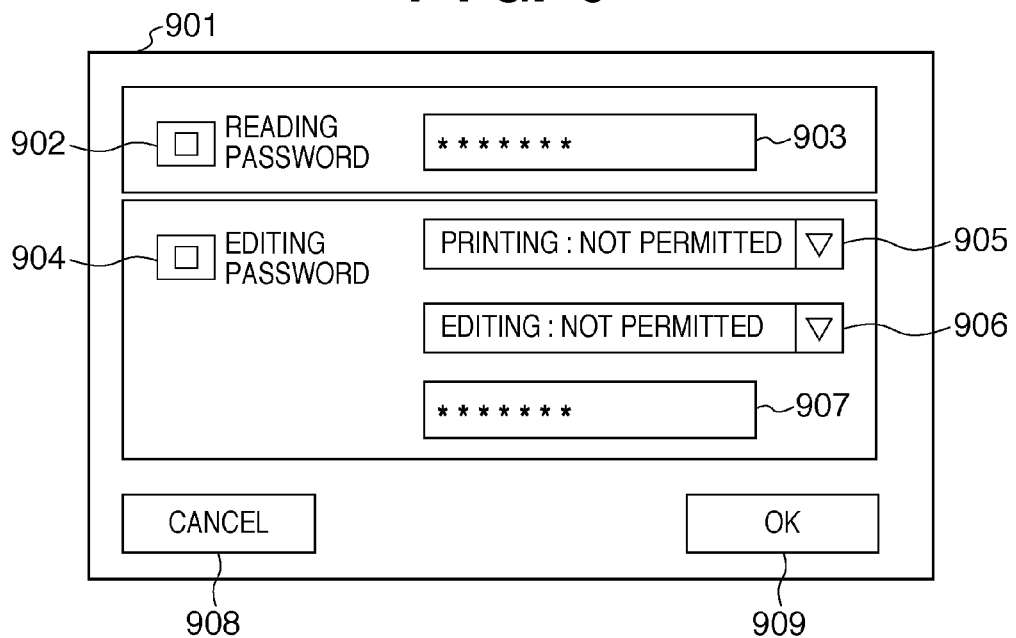
FIG. 9 is a diagram showing an advanced settings screen 901 according to an embodiment of the present invention.

FIG. 9 is a diagram showing the advanced settings screen 901 according to the present embodiment. The advanced settings screen 901 is a screen for setting detailed file settings that are displayed upon selection of a format in the selection section 805. The advanced settings screen 901 is configured to include a reading password settings designation button 902, a reading password input section 903, an editing password settings designation button 904, a printing designation selection section 905, an editing designation selection section 906, an editing password input section 907, a cancel button 908 and an OK button 909.

The reading password settings designation button 902 is a button for selecting whether or not to impose a reading password restriction. When this button has been pressed, the input of a password will be required when reading (opening) the file on the receiving side. Input to the reading password input section 903 is possible only when a password restriction has been enabled by the settings designation button 902. A password can be input with, for example, a software keyboard displayed separately on the screen.

The editing password settings designation button 904 is a button for selecting whether or not to impose an editing password restriction. When this button has been pressed, the input of a password will be required when editing the send file. The printing designation selection section 905 can be selected only when a password restriction has been enabled by the settings designation button 904, and an arbitrary setting can be selected from between the items "permitted" and "not permitted" regarding the use of the print function for the file. When "not permitted" has been selected, printing of the file at the transmission destination can be restricted.

The editing designation selection section 906 can be selected only when a password restriction has been enabled by the editing password settings designation button 904, and an arbitrary setting can be selected from among the items "page insertion, deletion and rotation permitted", "everything other than page extraction permitted", and "not permitted". Input to the editing password input section 907 is possible only when a password restriction has been enabled by the editing password settings designation button 904. Input to the input section 907 can be performed with a separately prepared software keyboard, as with the reading password input section 903.

When the cancel button 908 has been pressed, the file setting process is cancelled, and the selection of a format in the send file format selection section 805 shown in FIG. 8 is disabled. After that, the advanced settings screen 901 for the send file is closed, and the send settings screen 801 is displayed. When the OK button 909 has been pressed, the file settings process is confirmed. After that, the advanced settings screen 901 is closed, and the send settings screen 801 is displayed.

The advanced settings screen 901 shown in FIG. 9 is an example of a screen displayed when "PDF" has been selected in the send file format selection section 805 shown in FIG. 7. The screen configuration is limited to only settings necessary for the present embodiment, but it is also possible to set other function settings that can be set in PDF. In addition, when another file format such as "TIFF" or "JPEG" has been selected, a screen including different settable items is displayed.

Figure 10:
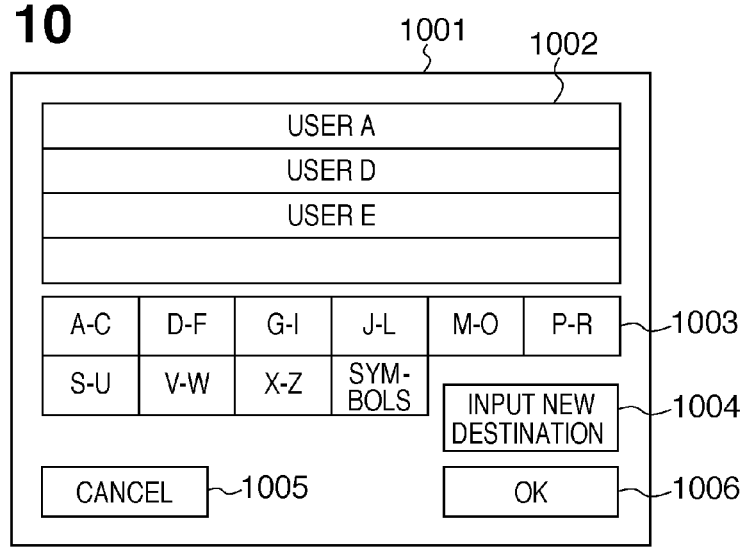
FIG. 10 is a diagram showing a destination settings screen 1001 according to an embodiment of the present invention.

FIG. 10 is a diagram showing the destination settings screen 1001 according to the present embodiment. The destination settings screen 1001 is a screen for setting a destination that indicates a file transmission destination that is displayed upon pressing the destination chart button 803. The destination settings screen 1001 is configured to include a destination list display section 1002 in which selected destinations are listed, a selection button 1003, a new destination input button 1004, a cancel button 1005 and an OK button 1006.

The destination list display section 1002 is a section in which information on a destination selected or input on the destination settings screen 1001 is displayed, and a plurality of destinations can be designated. The selection button 1003 is a button for selecting a destination from destination information that has already been registered, and is configured with a plurality of buttons showing the initial characters of the destination names. Upon selection of one of the selection buttons 1003, a list of destinations whose initial character corresponds to the selected button is displayed in a pop-up window or the like, from which a desired destination can be selected. The selected destination is added to and displayed in the list display section 1002. The list display section 1002 shown in FIG. 10 indicates that the user A, the user D and the user E have been selected as destination candidates by using the selection button 1003 or the like.

The new destination input button 1004 is a button that is pressed when a desired destination is not included in the destination chart. When the button is pressed, a software keyboard is displayed, and a destination can be input. When the content of an input character string has been confirmed with the software keyboard, it is added to and displayed in the list display section 1002 as a destination.

When the cancel button 1005 is pressed, the content of the settings of the list display section 1002 is discarded, the destination settings screen 1001 is closed without the existing destination information being updated, and the send settings screen 801 is displayed. When the OK button 1006 is pressed, the selected content in the list display section 1002 is confirmed, the destination settings screen 1001 is closed, and the send settings screen 801 is displayed. The procedure for checking the selected content executed by the OK button 1006 being pressed will be described later with reference to FIG. 12.

Process for Displaying Send Settings Screen

Figure 11:
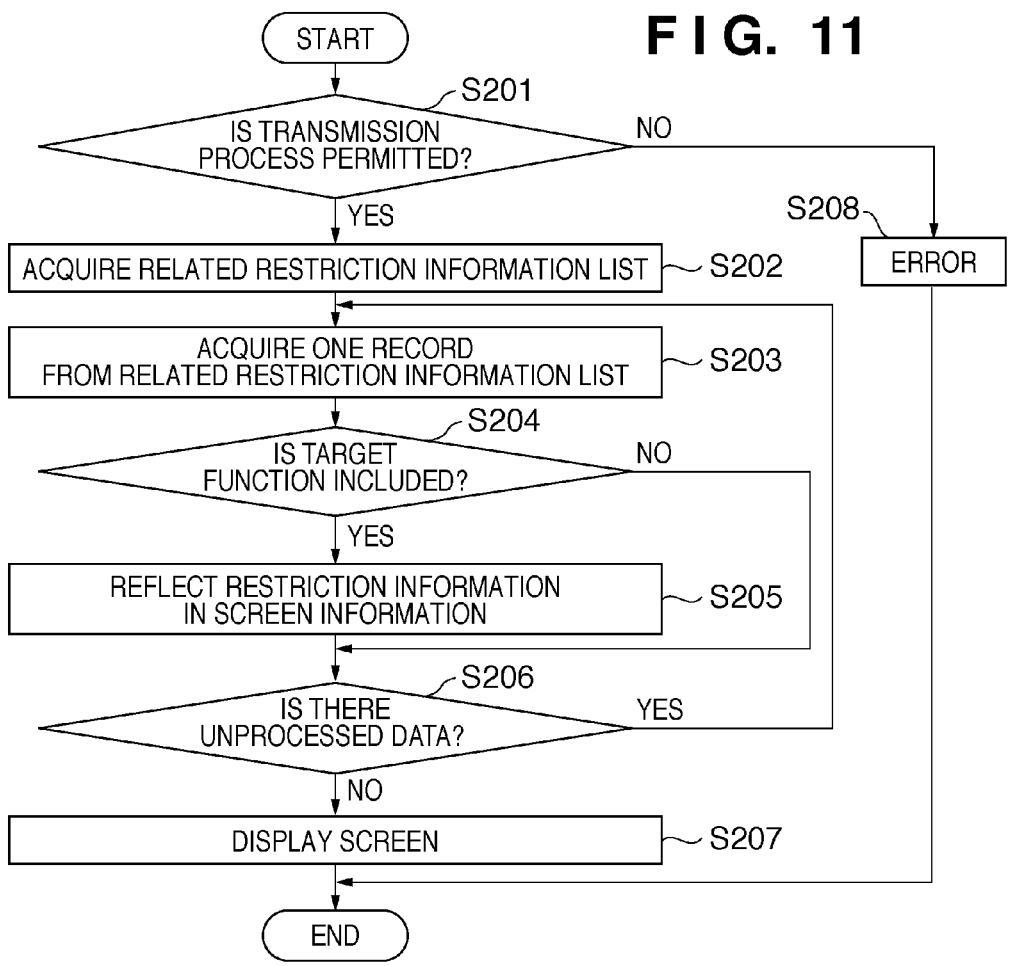
FIG. 11 is a flowchart showing a processing procedure for displaying a send settings screen according to an embodiment of the present invention.

Next, display control of the send settings screen 801 in which a restriction function has been reflected that is performed in Step S104 of FIG. 7 will be described with reference to FIG. 11. FIG. 11 is a flowchart showing a processing procedure for displaying a send settings screen according to the present embodiment. The process described below is collectively controlled by the CPU 206 of the image forming apparatus 102. Here, the process will be described based specifically on the assumption that the image forming apparatus 102 has already acquired the user information and function restriction information for a user (transmission source user) who has undergone an authentication process. It is also assumed here that "user D" is the transmission source user.

In Step S201, the CPU 206 refers to the information in send 404 that corresponds to "user D" so as to determine whether or not a send process is permitted. If the use of send process has been restricted, the CPU 206 advances the procedure to Step S208, where the CPU 206 executes an error process, and ends the process. In the error process, for example, an error display informing the user that a send process is not permitted is displayed on the display unit 211. If, on the other hand, the use of a send process is permitted, the CPU 206 advances the procedure to Step S202.

In Step S202, the CPU 206 acquires related restriction information stored within the image forming apparatus 102. Specifically, because the use of a "copy" function is disabled in the function restriction information corresponding to "user D" in the record 412, the CPU 206 acquires related restriction information in which "copy" is written in restriction function name 501. That is, the information on records 511, 512 and 513 is acquired from among the related restriction information shown in FIG. 5. After that, the CPU 206 repeats the processing spanning from Step S203 to Step S206, which will be described later, multiple times equal to the number of acquired records of related restriction information.

In Step S203, the CPU 206 acquires one record from among the acquired records of related restriction information. Next, in Step S204, the CPU 206 determines whether or not the acquired record includes a restriction process associated with a target function (a send function in this example). Specifically, the CPU 206 determines whether or not "send" has been defined in restriction process name 502 in the related restriction information. If "send" has been defined (the records 511 and 512 in this example), the CPU 206 advances the procedure to the next step, S205. If, on the other hand, SEND has not been defined, the CPU 206 proceeds to Step S206 (the record 513 in this example).

In Step S205, the CPU 206 causes the restricted condition of input sections and settings sections to be reflected in a settings screen displayed. Specifically, the following restriction is imposed. The record 511 indicates that only files in the "PDF" format that has been restricted according to "printing disabled", "editing disabled" and "password fixed" can be transmitted. Accordingly, the CPU 206 controls the advanced settings screen 901 as follows.

Editing password settings designation button 904→pressed state

Printing designation selection section 905→"Not permitted" is selected

Editing designation selection section 906→"Not permitted" is selected

Editing password input section 907→displayed as a section that does not accept input The record 512 indicates that the transmission of files in "TIFF" and "JPEG" formats has been restricted. Accordingly, the CPU 206 controls the send settings screen 801 as follows.

Send file format selection section 805→"TIFF" and "JPEG" buttons are displayed as buttons that do not accept input After the restriction of target records has been reflected in the manner as described above, the CPU 206 proceeds to Step S206. In Step S206, the CPU 206 determines whether or not any unprocessed records remain among the records acquired in Step S202. If an unprocessed record remains, the CPU 206 proceeds to Step S203. If all of the records have been processed, the CPU 206 proceeds to Step S207.

In Step S207, the CPU 206 displays a screen in which restriction information has been reflected in the display unit 211 of the image forming apparatus 102. In this manner, the function restriction imposed on the transmission source user, namely, "user D" can be applied to a process that can be implemented in cooperation with separate functions.

Process for Checking Selected Destination

Figure 12:
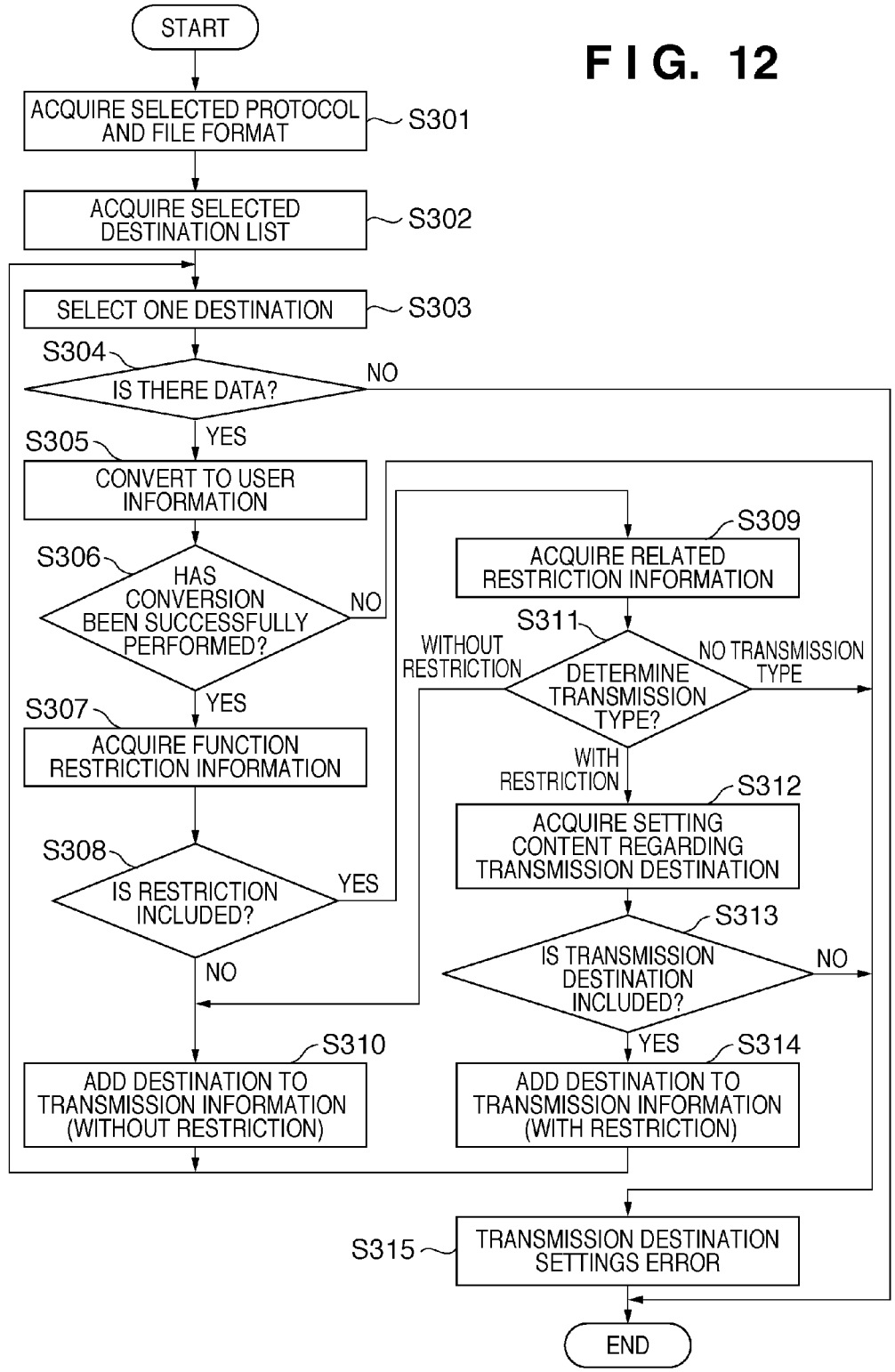
FIG. 12 is a flowchart showing a processing procedure of a process for checking a selected destination according to an embodiment of the present invention.

Next, a process for checking the validity of a selected destination when the OK button 1006 in the destination settings screen 1001 has been pressed will be described with reference to FIG. 12. FIG. 12 is a flowchart showing a processing procedure for checking a selected destination according to the present embodiment. The process described below is collectively controlled by the CPU 206 of the image forming apparatus 102.

In Step S301, the CPU 206 acquires a value of the transmission protocol selection section 804 and a value of the send file format selection section 805 that have been selected by the user via the send settings screen 801. Subsequently, in Step S302, the CPU 206 acquires all of the destination information displayed in the list display section 1002 of the destination settings screen 1001. Here, for example, information "user A", "user D" and "user E" is acquired.

Next, in Step S303, the CPU 206 selects one destination from among the destination information acquired in Step S302. The processing spanning from Step S303 to Step S314 is repeatedly executed multiple times equal to the number of destinations of the destination information acquired in Step S302. That is, here, "user A" is selected first, then, "user D" and "user E" are selected.

Upon selection of a destination, in Step S304, the CPU 206 determines whether or not destination information has been selected in Step S303. If destination information has been selected, the CPU 206 advances the procedure to Step S305. If destination information has not been selected, the CPU 206 determines in Step S302 that all of the acquired data has been processed, and ends the process.

In Step S305, the CPU 206 searches transmission destination information 406 shown in FIG. 4 for the corresponding information when the selected destination information is a value directly input by the user. If the corresponding information has been found, the CPU 206 converts the destination information in the corresponding user name 401. This process is skipped when the user has selected the destination from among the existing destination information.

Next, in Step S306, the CPU 206 determines whether or not the conversion process of Step S305 has been successfully performed. If conversion has not been performed, it is determined that a conversion process has been successfully performed. If the conversion process has been successfully performed, the CPU 206 advances the procedure to Step S307. If the conversion process has failed, the CPU 206 advances the procedure to Step S315.

In Step S307, the CPU 206 acquires the function restriction information for the transmission destination user from the selected destination information. Specifically, the data of records 411, 412 and 413 corresponding to "user A", "user D" and "user E" acquired in Step S302, respectively is acquired. That is, function restriction information is acquired for each of a plurality of transmission destinations.

In Step S308, the CPU 206 determines whether or not a function restriction is included in the acquired function restriction information. If a function restriction is included, the CPU 206 advances the procedure to Step S309. If a function restriction is not included, the CPU 206 advances the procedure to Step S310. For example, no function restriction is included in the record 411 of "user A", so the CPU 206 advances the procedure to Step S310. In the record 412 of "user D" and record 413 of "user E", a copy function has been restricted, so the CPU 206 advances the procedure to Step S309.

In Step S310, because the destination has been classified as an unrestricted transmission destination user, the CPU 206 adds the following record to the transmission information shown in FIG. 6. It is assumed that the transmission job ID in the following transmission information is "1". Specifically, the following record (a record 611 shown in FIG. 6) is added.

Transmission job ID 601→"1"
Presence/absence of restriction 602→"Absent"
File type 603→"PDF"
Transmission destination user information 604→"User A"

Here, as the file type 603, a file format that has been selected by the user via the send settings screen 801 is used. In this process as well, "user D" is assumed to operate this process, as with the case of the flowchart of FIG. 11, so the file type 603 is "PDF". In addition, in the case where such a record already exists, only "user A" is added in the transmission destination user information 604 section. The processing of one destination ends when record registration in the transmission information ends, so the CPU 206 returns the procedure to Step S303.

On the other hand, in Step S309, the CPU 206 acquires related restriction information corresponding to a restriction of a user with a function restriction. Specifically, because the use of a "copy" function is disabled in the record 412 of "user D" and the record 413 of "user E", information in which "copy" is written in restriction function name 501 in the related restriction information, namely, the records 511, 512 and 513 are acquired. Upon acquiring such related restriction information, the CPU 206 advances the procedure to Step S311.

In Step S311, the CPU 206 determines the type of transmission from the acquired records 511, 512 and 513. Specifically, whether or not a "send" function can be used and whether or not the file format matches the target file format if the use of a "send" function is enabled are determined. Here, if the use of a "send" function is enabled, and no restriction is written in restriction item 505, the CPU 206 advances the procedure to Step S310. If a restriction is written in restriction item 505, the CPU 206 advances the procedure to Step S312. In addition, when "disabled" is written in enable/disable 503 in the related restriction information, the CPU 206 determines the destination as a user to which transmission is disabled, and advances the procedure to an error process of Step S315.

For example, in the record 511, a setting that only files in the target format "PDF" can be transmitted is made for the "send" function, and restrictions are also written in restriction item 505, so in the case of "user D" and "user E", the CPU 206 advances the procedure to Step S312. In Step S312, the CPU 206 acquires the transmission protocol information for the transmission protocol selection section 804 selected via the send settings screen 801 and transmission destination information 406. Specifically, "email" is acquired as a transmission protocol, and "User_D@mail.canon.jp" and "-" are acquired as the transmission destination information 406 of "user D" and "user E".

Subsequently, in Step S313, the CPU 206 determines whether or not appropriate transmission destination information for the specified job is included in the information acquired in Step S312. That is, the CPU 206 determines whether or not appropriate information regarding the transmission destination has been registered in the settings content set by the user. If appropriate transmission destination information is included, the CPU 206 advances the procedure to Step S314. If appropriate transmission destination information is not included, the CPU 206 advances the procedure to Step S315. Specifically, because "email" has been selected as a protocol, and an email address "User_D@mail.canon.jp" has been registered in transmission destination information 406 in the record 412 of "user D", the CPU 206 determines that transmission is possible, and advances the procedure to Step S314. On the other hand, in the record 413 of "user E", "-" (not set) has been registered in transmission destination information 406, so the CPU 206 determines that transmission is not possible, and advances the procedure to Step S315.

In Step S314, because the destination has been classified as a restricted transmission destination user, the CPU 206 adds a record to the transmission information. Specifically, the following record (a record 612 of FIG. 6) is added.

Transmission job ID 601→"1"
Presence/absence of restriction 602→"Present"
File type 603→"PDF"
Transmission destination user information 604→"User D"

The transmission job ID 601 and the file type 603 are the same as those of Step S310, so a description thereof is omitted here. If such a record already exists, "user D" is added in the transmission destination user information 604 section. The processing of one destination ends when record registration in the transmission information ends, so the CPU 206 returns the procedure to Step S303.

On the other hand, in Step S315, because the destination has been classified as a user to which transmission is disabled, the CPU 206 does not add a record to the transmission information, and processes it as a settings error. For example, the CPU 206 causes an error screen or the like indicating that the designated destination is not appropriate to be displayed, and ends the process upon completion of the display.

Process for Creating Send File

Figure 13:
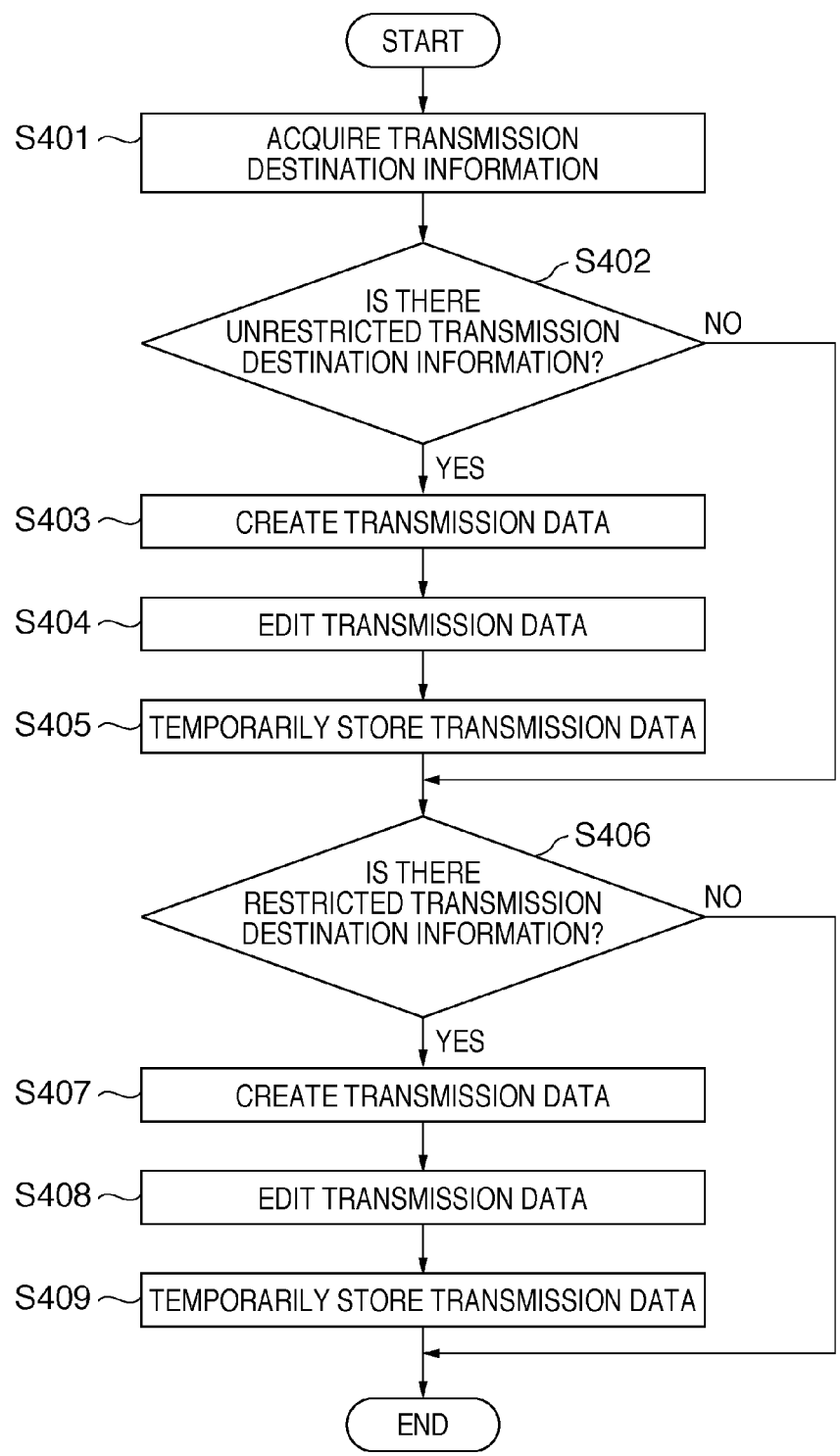
FIG. 13 is a flowchart showing a processing procedure of a process for creating a send file according to an embodiment of the present invention.

Next, a process for creating a send file performed in Step S109 will be described with reference to FIG. 13. FIG. 13 is a flowchart showing a processing procedure for creating a send file according to the present embodiment. The process described below is collectively controlled by the CPU 206 of the image forming apparatus 102. Here, the process will be described based specifically on the assumption that the image forming apparatus 102 has already acquired the user information and function restriction information for a user who has undergone an authentication process. It is also assumed that "user A" and "user D" are transmission destination users to which image data is transmitted.

First, in Step S401, the CPU 206 acquires settings content (operation settings) set by the user via the send settings screen 801 in Step S106 of FIG. 7. For example, the settings content is assumed to be set as follows.

Destination information display section 802→email addresses of user A and user D (arbitrary input)

Transmission protocol selection section 804→email (arbitrary input)

Send file format selection section 805→"PDF" (system-fixed)

Reading password settings designation button 902→undesignated (arbitrary input)

Reading password input section 903→undesignated (arbitrary input)

The item with "system-fixed" in parentheses in the above settings is an item in which input or selection cannot be made by the user (an item in which a restriction has been reflected that was described in relation to FIG. 11), and the items with "arbitrary input" are items in which input or selection is made by the user.

At this point in time, a record with a job ID that matches the target transmission job ID 601 ("1" in this example) is acquired from the transmission information shown in FIG. 6. Specifically, the records 611 and 612 are acquired. Upon acquiring the settings content via the send settings screen 801, the CPU 206 advances the procedure to Step S402.

In Step S402, the CPU 206 determines whether or not there is unrestricted transmission information. That is, the CPU 206 determines whether or not there is a record that has been registered in Step S310 of FIG. 12. If such a record has been found, the CPU 206 advances the procedure to Step S403. If such a record has not been found, the CPU 206 advances the procedure to Step S406.

In Step S403, the CPU 206 generates transmission data from the image information for a paper original that was stored in the RAM 208 or the HDD 209 in Step S108. Subsequently, in Step S404, the CPU 206 edits the transmission data in accordance with the related restriction information by using the settings content acquired via the send settings screen 801 and the job record 611 acquired in Step S401. Specifically, the following settings are set.

Destination information display section 802 that indicates a transmission destination→email address of user A (arbitrary input)

Transmission protocol selection section 804→email (arbitrary input)

Send file format selection section 805→"PDF" (system-fixed)

Reading password settings designation button 902→undesignated (arbitrary input)

Reading password input section 903→unset (in tandem with 902)

Editing password settings designation button 904→undesignated (system-fixed)

Printing designation selection section 905→"Permitted" (system-fixed)

Editing designation selection section 906→"Permitted" (system-fixed)

Editing password input section 907→undesignated (system-fixed)

As described above, regarding a send file to be transmitted to user A, the print designation and edit designation are edited to "Permitted" based on the user's settings content, record 611 and related restriction information.

Next, in Step S405, the CPU 206 generates a file containing the transmission data generated and edited in Steps S403 and S404 with the file generation unit 214, and stores the file in the RAM 208 or the HDD 209. Then, the storage location information is added to storage location 605 of the record 611 acquired in Step S402.

Next, in Step S406, the CPU 206 determines whether or not there is restricted transmission information. That is, the CPU 206 determines whether or not there is a record that has been registered in Step S314 of FIG. 12. If such a record has been found, the CPU 206 advances the procedure to Step S407. If such a record has not been found, the CPU 206 ends the process.

In Step S407, the CPU 206 generates transmission data from the image information for a paper original that was read in Step S108 of FIG. 7 and stored in the RAM 208 or the HDD 209. Subsequently, in Step S408, the CPU 206 edits the transmission data in accordance with the related restriction information by using the settings content acquired via the send settings screen 801 and the job record 612 acquired in Step S401. Specifically, the following settings changes are made.

Destination information display section 802 that indicates a transmission destination→email address of user D (arbitrary input)

Transmission protocol selection section 804→email (arbitrary input)

Send file format selection section 805→"PDF" (system-fixed)

Reading password settings designation button 902→undesignated (arbitrary input)

Reading password input section 903→undesignated (arbitrary input)

Editing password settings designation button 904→designated (system-fixed)

Printing designation selection section 905→"Not permitted" (system-fixed)

Editing designation selection section 906→"Not permitted" (system-fixed)

Editing password input section 907→undesignated (system-fixed)

As described above, regarding a send file to be transmitted to user D, the print designation and edit designation are edited to "Not permitted" based on the user's settings content, record 612 and related restriction information.

Next, in Step S409, the CPU 206 generates a file containing the transmission data generated and edited in Steps S407 and S408 with the file generation unit 214 of FIG. 2, and stores the file in the RAM 208 or the HDD 209. Then, the storage location information is added to storage location 605 of the record 612 acquired in Step S406.

In Steps S404 and S408, as the editing password, an arbitrary password is issued and set in the editing password input section 907. The issuance of a password is performed internally on the image forming apparatus 102 side, based on "password fixed" in the related restriction information, such that the print/edit settings will not be changed after transmission of the file to the outside, and the issued password is not disclosed to the outside. Accordingly, with respect to the password generation logic, a password may be created from arbitrary information within the image forming apparatus 102, or may be created dynamically by using the processing date or the like.

Send Process Flow

Figure 14:
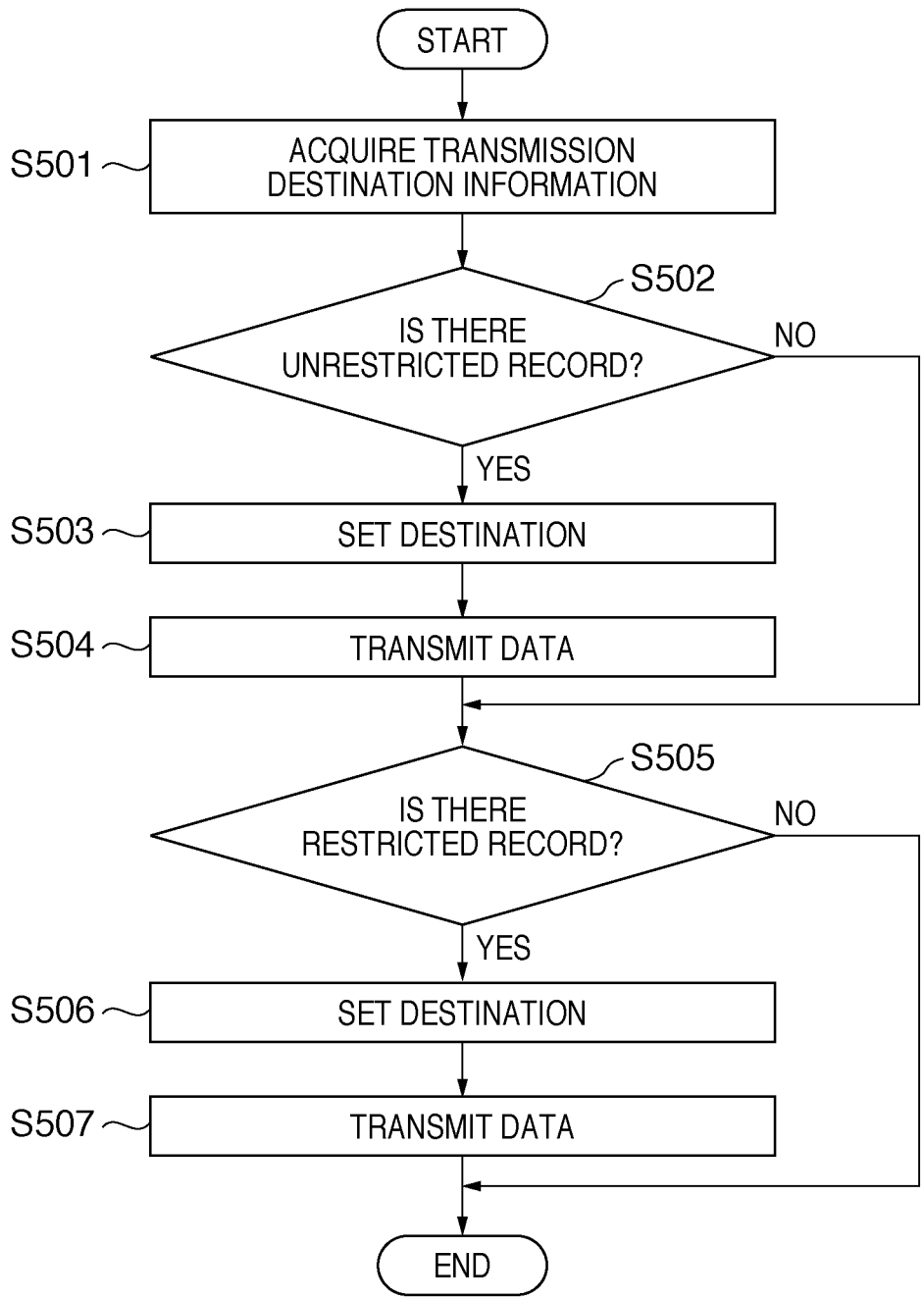
FIG. 14 is a flowchart showing a processing procedure of a send process according to an embodiment of the present invention.

Next, a send process in which a function restriction has been reflected that is performed in Step S110 will be described with reference to FIG. 14. FIG. 14 is a flowchart showing a processing procedure of the send process according to the present embodiment. The process described below is collectively controlled by the CPU 206 of the image forming apparatus 102. Here, the process will be described specifically based on the transmission information generated in the flowchart of FIG. 13.

In Step S501, the CPU 206 acquires a record with a job ID that matches transmission job ID 601 ("1" in this example) from among the records of transmission information shown in FIG. 6. Specifically, the records 611 and 612 are acquired. Subsequently, in Step S502, the CPU 206 determines whether or not there is an unrestricted record in the target job. Specifically, if a record that has been registered in S310 of FIG. 12 described above has been found, the CPU 206 advances the procedure to Step S503. If, on the other hand, such a record has not been found, the CPU 206 advances the procedure to Step S505.

In Step S503, the CPU 206 acquires transmission destination information 406 shown in FIG. 4 based on the destination information written in the transmission destination user information 604 of the record 611. Subsequently, in Step S504, the CPU 206 acquires an unrestricted send file according to the information written in storage location 605 of the record 611. Furthermore, the CPU 206 determines the transmission destination information 406 acquired in Step S503 as a destination, transmits the send file according to the transmission protocol set in Step S404, and advances the procedure to Step S505. In the case where a plurality of transmission destination users have been set in the record 611, or where a plurality of transmission destination users can be designated at a time in an email or the like, it is possible to perform the transmission process only once collectively, rather than performing it for each destination.

In Step S505, the CPU 206 determines whether or not there is a restricted record in the target job. If a record that has been registered in Step S314 shown in FIG. 12 has been found, the CPU 206 advances the procedure to Step S506. If, on the other hand, such a record has not been found, the CPU 206 ends the transmission process.

In Step S506, the CPU 206 acquires transmission destination information 406 shown in FIG. 4 based on the destination information written in the transmission destination user information 604 of the record 612. Subsequently, in Step S507, the CPU 206 acquires a restricted send file according to the information written in storage location 605 of the record 612. Furthermore, the CPU 206 determines the transmission destination information 406 acquired in Step S506 as a destination, transmits the send file according to the transmission protocol set in Step S408, and ends the process. In the case where a plurality of transmission destination users have been set in the record 612, or where a plurality of transmission destination users can be designated at a time in an email or the like, it is also possible to perform the transmission process only once collectively on the files containing common restriction information, rather than performing it for each destination.

As described thus far, the image forming apparatus of the present embodiment holds related restriction information that is associated with function restriction information for restricting the use of an image processing function provided within a network managed by a management apparatus connected via the network. The related restriction information is information for restricting the use of another image processing function in association with an image processing function restricted by the function restriction information. Specifically, the related restriction information includes information for restricting a function restricted by function restriction information from being implemented through the combined use of a plurality of other functions. For example, the related restriction information includes information for restricting the same function as a copy function from being implemented through the combined use of a reading function, a transmission function and a print function when the use of a copy function has been prohibited in the function restriction information corresponding to a specified user. With the use of the related restriction information, if the image forming apparatus of the present embodiment receives a job that executes a reading function and a transmission function, for example, the image forming apparatus displays, for the transmission source user, a settings screen for setting job operation settings in which restrictions held in the function restriction information and the related restriction information have been reflected. Furthermore, the image forming apparatus generates and transmits a send file in which the restrictions imposed on the transmission destination user have been reflected by using the job operation settings set via the settings screen, the function restriction information and the related restriction information. With such a configuration, the image forming apparatus of the present invention can restrict an image processing function restricted by function restriction information from being implemented through the combined use of a plurality of other image processing functions, and also can impose restrictions on a user-by-user basis when transmitting image data obtained through the reading of an original to another user. As for the restriction information, only restriction information corresponding to a transmission destination user may be reflected, or the restriction information for both users, namely a user as a sender and a user as a transmission destination, may be reflected. In the case of causing the restriction information for both users to be reflected, it is preferable to create more stringent restriction information, but the restriction items may be determined based on other conditions. In addition, the restriction items may be functions other than a copy function.

The present invention is not limited to the above-described embodiment, and various modifications can be made. For example, in the above-described embodiment, a configuration has been described in which the image forming apparatus 102 holds related restriction information, but it is possible to employ a configuration in which the user restriction information management apparatus 101 holds related restriction information. In this case, the related restriction information is acquired from the user restriction information management apparatus 101 at the time when the image forming apparatus 102 acquires the information. Also, the network 104 has been described as a single network, but a client apparatus as a file transmission destination may exist in a location from a local network called a LAN via the Internet.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-027785 filed on Feb. 9, 2009, which is hereby incorporated by reference herein in its entirety.

What is claimed is:

1. An image processing apparatus that is capable of transmitting image data to a designated transmission destination, the apparatus comprising:
    a processor coupled to a memory, cooperating to function as:
    an input unit that inputs image data,
    an acquiring unit that acquires function restriction information representing an image processing function, the function restriction information corresponding to any of a plurality of image processing functions, for restricting use of the image processing function by a transmission destination user,
    a determining unit that determines a restriction function among the plurality of image processing functions for the image data input by the input unit based on the function restriction information acquired by the acquiring unit and an image processing function that can be implemented through combined use of the image processing apparatus and another image processing apparatus, and
    an appending unit that appends attribute information corresponding to the restriction function determined by the determining unit to the image data input by the input unit; and
    a transmitter that transmits the image data, to which the attribute information corresponding to the restriction function has been appended by the appending unit, to the transmission destination.

2. The image processing apparatus according to claim 1, further comprising a reader that reads an image of an original, and generates image data representing the image,
    wherein the appending unit appends attribute information indicating print prohibition to the image data input by the input unit from the reader.

3. The image processing apparatus according to claim 2, wherein the appending unit appends the attribute information indicating print prohibition to the image data input by the input unit from the reader when the function restriction information acquired by the acquiring unit indicates copy prohibition.

4. The image processing apparatus according to claim 1, wherein said processor and memory further cooperate to act as a selecting unit that selects a file format for image data to be transmitted by the transmitter,
    wherein the selecting unit restricts a file format to which attribute information cannot be appended by the appending unit from being selected.

5. The image processing apparatus according to claim 1, wherein the acquiring unit further acquires function restriction information for a user that input image data to the input unit, and the determining unit determines the restriction function based on the function restriction information for a user who has input image data with the input unit and the transmission destination user acquired by the acquiring unit.

6. The image processing apparatus according to claim 1, wherein the transmitter is capable of transmitting image data to a plurality of transmission destinations, and
    the acquiring unit acquires function restriction information for each of the plurality of transmission destinations.

7. The image processing apparatus according to claim 6, wherein, when transmitting image data to a plurality of transmission destinations, the transmitter transmits image data to which the attribute information corresponding to a restriction function has been appended by the appending unit and image data to which the attribute information has not been appended.

8. A method of controlling an image processing apparatus that is capable of transmitting image data to a designated transmission destination, the method comprising:
    inputting image data;
    acquiring function restriction information representing image processing function, the function restriction information corresponding to any of a plurality of image processing functions, for restricting usage by a user corresponding to the transmission destination of the input image;
    determining a restriction function among the plurality of image processing functions for the image data input in the input step based on the function restriction information acquired in the acquiring step and an image processing function that can be implemented through combined use of the image processing apparatus and another image processing apparatus;
    appending attribute information regarding the restriction function determined in the determining step to the image data input in the input step; and
    transmitting the image data to which the attribute information regarding the restriction function has been appended in the appending step to the transmission destination.

9. A non-transitory computer-readable storage medium storing a computer program for causing a method to be performed by an image processing apparatus, the method comprising:
    inputting image data;
    acquiring function restriction information representing image processing function, the function restriction information corresponding to any of a plurality of image processing functions, for restricting usage by a user corresponding to the transmission destination of the input image;
    determining a restriction function among the plurality of image processing functions for the image data input in the input step based on the function restriction information acquired in the acquiring step and an image processing function that can be implemented through combined use of the image processing apparatus and another image processing apparatus;

appending attribute information regarding the restriction function determined in the determining step to the image data input in the input step; and transmitting the image data to which the attribute information regarding the restriction function has been appended in the appending step to the transmission destination.

* * * * *